United States Patent [19]

Tadauchi

[11] 3,979,760

[45] Sept. 7, 1976

[54] ELECTROSTATIC RECORDING APPARATUS WITH AUXILIARY ELECTRODES

[75] Inventor: Masaharu Tadauchi, Hitachi, Japan
[73] Assignee: Hitachi, Ltd., Japan
[22] Filed: Mar. 4, 1975
[21] Appl. No.: 555,280

[30] Foreign Application Priority Data
  Mar. 6, 1974  Japan................................ 49-25195

[52] U.S. Cl. ........................ 346/74 EE; 346/74 EH
[51] Int. Cl.² ................ G03G 15/044; G01D 15/06
[58] Field of Search ....... 346/74 EE, 74 EL, 74 EH, 346/74 ES, 74 E; 178/6.6 A

[56] References Cited
UNITED STATES PATENTS

| | | | |
|---|---|---|---|
| 2,930,847 | 3/1960 | Metzger........................... | 346/74 EE |
| 3,624,661 | 11/1971 | Shebanow....................... | 346/74 EE |
| 3,662,396 | 5/1972 | Brown............................. | 346/74 EE |
| 3,877,038 | 4/1975 | Krekow .......................... | 346/74 EH |

Primary Examiner—Bernard Konick
Assistant Examiner—Jay P. Lucas
Attorney, Agent, or Firm—Craig & Antonelli

[57] ABSTRACT

There is disclosed an electrostatic recording apparatus comprising a plurality of wire electrode groups each constituting a block, the corresponding wire electrodes of the respective groups being simultaneously scanned, a pair of auxiliary electrode rows arranged respectively along both sides of and in opposite to the wire electrode groups, the auxiliary electrodes of one row being positioned in a zigzag form relative to those of the other row and each of the auxiliary electrodes having approximately the same length as the width of one block of the wire electrodes, and means for scanning the auxiliary electrodes at a predetermined phase difference. The recording by one wire electrode group is performed by applying respective recording voltages or currents between the one wire electrode group and ones of the auxiliary electrodes opposite thereto.

3 Claims, 15 Drawing Figures

ELECTROSTATIC RECORDING APPARATUS WITH AUXILIARY ELECTRODES

The present invention relates to an electrostatic recording apparatus and more in particular to an electrostatic recording apparatus for effecting a recording operation by applying signal voltages between a plurality of wire electrodes and auxiliary electrodes opposite thereto.

Recently, attempts have been made to employ an electrostatic or discharge type recording apparatus in a system such as facsimile system or printer. Such systems have been practically used. Such a recording apparatus operates on the fundamental principle that a recording paper is run in a space between at least one pair of electrodes opposite thereto while at the same time a voltage corresponding to an external signal is applied between these electrodes, so that an electrostatic image is recorded and developed on the recording paper.

The above-mentioned recording apparatus is classified into a mechanical type using mechanical contacts and an electronic type using electronic switches, depending upon the manner whereby an external signal is distributed.

The mechanical type apparatus, in which the recording section has mechanically moving portions is easily worn, resulting in a short life time thereof and requiring great time for the maintenance thereof. Further, there are disadvantages in that the recording speed is limited and noises may be generated.

On the other hand, the electronic type apparatus which obviates all the disadvantages inherent to the mechanical type apparatus has been proposed with various arrangements.

In a typical example of the conventional electronic type apparatuses, the electrostatic recording is effected in such a manner that a plurality of recording wire electrodes are repeatedly scanned by an information signal while at the same time a potential reverse to that of the wire electrodes is synchronously applied to auxiliary electrodes opposite to the wire electrodes thereby to produce between the wire and auxiliary electrodes a potential difference necessary to electrostatic recording. Thus, the plurality of wire electrodes are sequentially scanned while being selected by the auxiliary electrodes opposite thereto so that the recording of one line is completed.

Therefore, the plurality of wire electrodes and the auxiliary electrodes must be provided with many driving circuits. In the case where a recording operation is performed on a recording paper of Series A No. 4 size (in Japanese Industrial Standards) with a line density of 6 lines per millimeter, for example, 1280 wire electrodes are arranged on one line. If the wire electrodes are divided into 20 blocks, 64 and 41 driving circuits are required for the wire electrode groups and the auxiliary electrodes respectively.

In this case, since the length of one block in a direction of the line is about 10 mm and there are correspondingly two auxiliary electrodes, the length of one auxiliary electrode is about 5 mm. Practically, it is very difficult to arrange these auxiliary electrodes along the line with a high accuracy.

Accordingly, an object of the present invention is to simplify the arrangement of an electrostatic recording apparatus with the number of auxiliary electrodes effectively reduced, in which the electrostatic recording is effected by applying signal voltage between wire electrodes and auxiliary electrodes.

According to the present invention, there is provided an electrostatic recording apparatus comprising a plurality of wire electrode groups each constituting a block, the corresponding same-ordered wire electrodes of the respective blocks being simultaneously scanned, a pair of auxiliary electrode rows provided respectively along both sides of and opposite to the wire electrode groups, the auxiliary electrodes of one row being arranged in a zigzag form relative to those of the other row and each of the auxiliary electrodes having approximately the same length as that of each of the blocks, and a scanning circuit for scanning the auxiliary electrodes at a predetermined phase difference.

Other objects and features of the present invention will become apparent when reading the following detailed description in conjunction with the accompanying drawings, in which:

Figure 1:
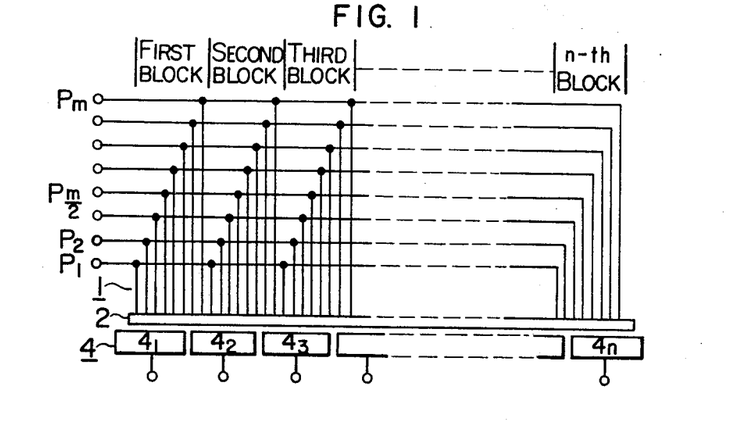
FIG. 1 is a diagram showing the operation principle of a recording apparatus according to the present invention.

In FIG. 1 showing the operation principle of the recording apparatus according to the present invention, reference numeral 1 designates a plurality of wire electrode groups. In fact, the wire electrodes are arranged on a straight line in the scanning direction thereof. For purpose of simplicity of scanning, the wire electrodes are grouped into a plurality of ($n$) blocks and the same-ordered wire electrodes within the respective blocks are connected to information signal terminals $P_1$ to $P_m$ respectively. Reference numeral 2 designates an electrostatic recording paper, and numeral 4 a set of auxiliary electrodes located opposite to the wire electrode groups 1 with the recording paper 2 interposed therebetween. The auxiliary electrode set 4 comprises auxiliary electrodes $4_1, 4_2, 4_3 \ldots$ and $4_n$. The length of each auxiliary electrode is approximately equal that ($l$) of each block of the wire electrode groups 1. The auxiliary electrodes $4_1, 4_2, 4_3 \ldots$ and $4_n$ are arranged at the phase difference of 90° relative to the respective blocks of the wire electrode groups 1.

Figure 2:
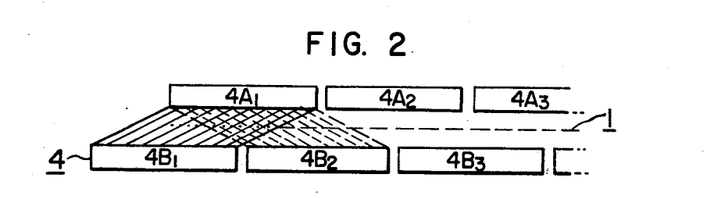
FIG. 2 is a plan view showing an electrode arrangement used in the invention.

In order to prevent the wire electrodes from being brought into contact with the auxiliary electrodes due to a possible damage of the electrostatic recording paper 2, the auxiliary electrodes are arranged in two rows A and B along both sides of the wire electrode groups 1. As shown in FIG. 2, the positional relationship between the plurality of wire electrode groups 1 and the auxiliary electrodes is such that the auxiliary electrodes $4A_1$, $4A_2$ . . . in row A and the auxiliary electrodes $4B_1$, $4B_2$ . . . in row B arranged in an offset form respectively along both sides of a row of the wire electrode groups 1. In other words, the auxiliary electrodes $4A_1$, $4B_1$, $4A_2$, $4B_2$, . . . are arranged in a zigzag form.

In operation of electrostatic recording on the electrostatic recording paper 2 by such a recording apparatus, the information signal terminals $P_1$ to $P_m$ are repeatedly scanned with information signals. Synchronously with the scanning, in a scanning range of the first block from the information signal terminals $$P_1 \text{ to } P\left(\frac{m}{2}\right)$$

(or from $P_1$ to $$P\left(\frac{m+1}{2}\right)$$

in the case where $m$ is of odd number), the auxiliary electrode $4A_1$ in row A and the auxiliary electrode $4B_1$ in row B are energized, thereby enabling the recording operation only with the wire electrodes within the region defined by solid oblique lines in FIG. 2. In a scanning range from $$P\left(\frac{m}{2}+1\right)$$

to $P_m$, the auxiliary electrode $4A_1$ in row A and the auxiliary electrode $4B_2$ in row B are energized, thereby enabling the recording operation within the region defined by dashed oblique lines. In like manner, subsequent recording operations are performed by sequentially scanning the auxiliary electrodes $4A_2$, $4B_3$, $4A_3$, $4B_4$ . . . at the phase difference of 90°. The change from one auxiliary electrode to the next one in row A is carried out when the information signal terminal $P_1$ is scanned, whereas the similar change in row B is carried out when the information signal terminal $$P\left(\frac{m}{2}+1\right)$$

is scanned.

This recording apparatus is designed such that the energization of only the auxiliary electrodes 4 in row A or row B causes no electrostatic recording to be effected in cooperation with the potential of the wire electrode groups 1. For instance, even if +300 V and −350 V are applied to the wire electrode group and the auxiliary electrode $4B_1$ in row B respectively, the apparatus must be inoperative in effecting the recording by the wire electrode group within the region defined by the solid oblique lines in FIG. 2 if the auxiliary electrode $4A_1$ in row A is at zero volt. Preferably, the plurality of wire electrode groups 1 should be shifted to be nearer to row A along a line between rows A and B of the auxiliary electrodes 4, as shown.

It will be understood from the foregoing description that according to the present invention it is possible to scan individually the wire electrode groups 1 for recording through each of the auxiliary electrodes $4A_1$, $4A_2$ . . . and $4B_1$, $4B_2$ . . . is doubled or lengthened twice. However, the number of the auxiliary electrodes is reduced by one half. Thus, the auxiliary electrodes are reduced in number by increasing the size thereof.

Instead of the phase difference of 90°, the change of the auxiliary electrodes from row A to row B or from row B to row A may be carried out at any other phase difference so far as a region of the wire electrode groups 1 in which a recording is possible by the cooperation of the auxiliary electrodes of rows A and B coincides with the scanning position of the wire electrode groups 1. The allowable range of phase difference depends upon the interval between rows A and B of the auxiliary electrodes and the magnitude of applied voltage.

Figure 3:
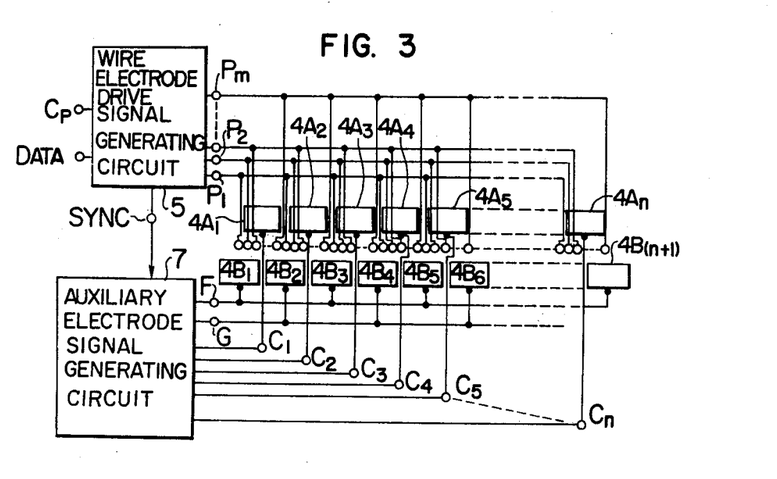
FIG. 3 is a block diagram of a first embodiment of the recording apparatus according to the invention.

A first embodiment of the recording apparatus is shown in the block diagram of FIG. 3. In this example, the auxiliary electrodes $4A_1$, $4A_2$ . . . $4A_n$ in row A are sequentially selectively scanned, whereas the auxiliary electrodes $4B_1$, $4B_2$ . . . $4B_{(n+1)}$ in row B are divided into odd-numbered and even-numbered groups selectively scanned alternately in order that the cooperation of the apart spaced auxiliary electrodes, for example, the cooperation of the auxiliary electrode $4A_1$ and the auxiliary electrodes $4B_3$, $4B_4$, . . . produces no electric potential distribution operative for recording. This construction is intended to greatly reduce the number of auxiliary electrode driving circuits. A clock pulse terminal $C_p$ connected to a wire electrode drive signal generating circuit 5 sequentially and repeatedly distributes, an information signal applied to a data terminal DATA, to the information signal terminals $P_1$ to $P_m$. In this distributing operation, a synchronizing signal SYNC is produced for synchronous operation of an auxiliary electrode signal generating circuit 7. When the wire electrode drive signal generating circuit 5 is scanning the range from the information signal terminals $P_1$ to $$P\left(\frac{m}{2}\right)$$

of the first block, the auxiliary electrode signal generating circuit 7 produces a voltage at a terminal F for energizing the odd-numbered auxiliary electrodes $4B_1$, $4B_3$ . . . in row B. When the range from the information signal terminal $$P\left(\frac{m}{2}+1\right)$$

of the first block to $$P\left(\frac{m}{2}\right)$$

of the second block is being scanned, a voltage is produced at a terminal G for energizing the even-numbered electrodes $4B_2$, $4B_4$ . . . In like manner, the energization alternates between odd-numbered and even-numbered auxiliary electrodes each time of scanning of the terminal $$P\left(\frac{m}{2}+1\right).$$

This alternation between odd-numbered and even-numbered auxiliary electrodes is realized actually by provision of a flip-flop circuit actuated by a scanning signal applied to the information signal terminal $$P\left(\frac{m}{2}+1\right).$$

The auxiliary electrode signal generating circuit 7 sequentially produces a voltage at terminals $C_1, C_2 \ldots C_n$ respectively in synchronism with the completion of the scanning cycles of the auxiliary electrodes $4A_1, 4A_2 \ldots 4A_n$ in row A. This operation may be performed by providing a counter which counts the number of the scanning cycles or blocks to sequentially apply the voltage to the terminals $C_1$ to $C_n$.

Figure 4:
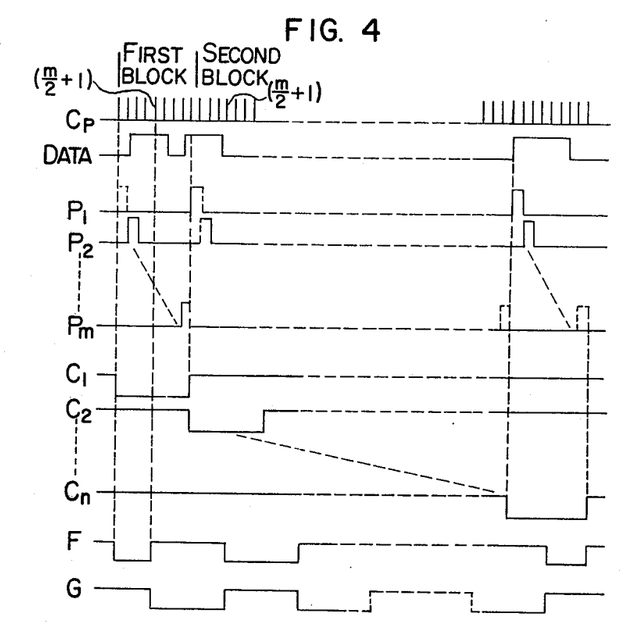
FIG. 4 shows waveforms for explaining the operation of the first embodiment shown in FIG. 3.

The recording operation will be explained below with reference to FIG. 4. In the figure, signal waveforms at the above-described terminals are shown by the same reference symbols as the terminals. In the recording in the first block, even though the information signal terminal $P_1$ is selected by the first clock pulse at the terminal $C_p$, the signal at the DATA terminal is "O" so that no recording signal is produced. Under this condition, the auxiliary electrode $4A_1$ is selected in row A and the odd-numbered auxiliary electrodes $4B_1, 4B_3 \ldots$ are selected in row B. The information signal terminal $P_2$ is selected in response to the second clock pulse so that the electrostatic recording is performed since the signal at the DATA terminal is "1". In subsequent scanning processes, the auxiliary electrodes in row B are changed from odd-numbered ones to even-numbered ones $4B_2, 4B_4 \ldots$ when the information signal terminal $$P\left(\frac{m}{2}+1\right)$$

is reached. Further, when the second block is reached after covering the whole of the first block, the auxiliary electrode $4A_2$ in row A is selected. And, when the terminal $$P\left(\frac{m}{2}+1\right)$$

of the second block is reached, the auxiliary electrodes in row B are changed to odd-numbered ones $4B_1, 4B_3 \ldots$ Subsequently, the auxiliary electrodes in rows A and B are selected alternately sequentially at the scanning phase difference of 90° and at the scanning cycle of 180°, with the result that the recording for one line is effected in cooperation with the wire electrode groups 1.

In the above-described recording apparatus according to the invention, each of the auxiliary electrodes is about twice in length in the scanning direction and therefore they are reduced by one half in number, thus facilitating the manufacture of the auxiliary electrodes themselves. In addition, the auxiliary electrodes in row B may be scanned alternately between odd-numbered and even-numbered ones, thereby leading to the advantage that only two driving circuits are required for row B.

Figure 5:
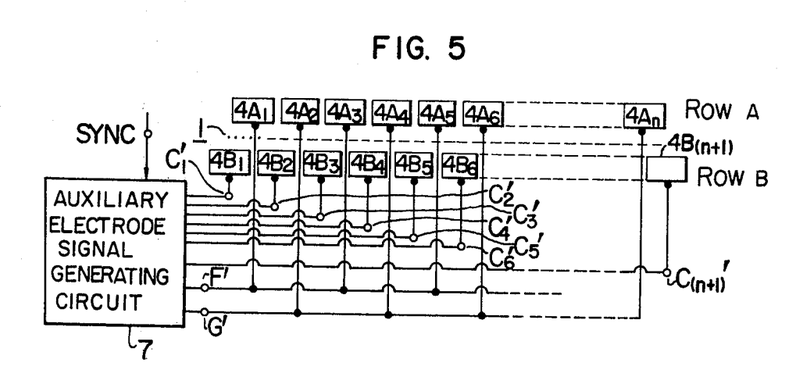
FIG. 5 is a block diagram of a second embodiment of the recording apparatus according to the invention.
Figure 6:
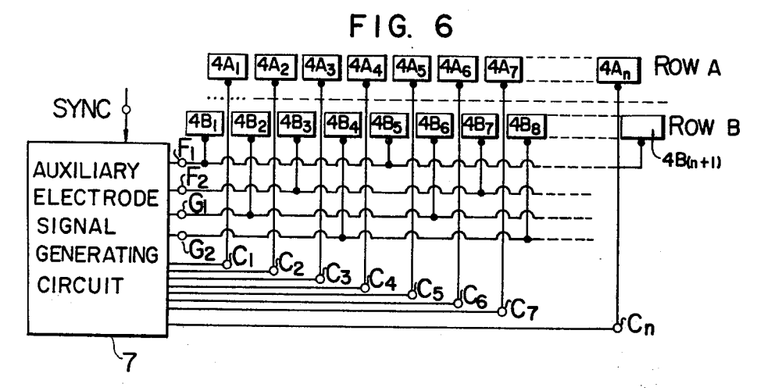
FIG. 6 is a block diagram of a third embodiment of the recording apparatus according to the invention.
Figure 7:
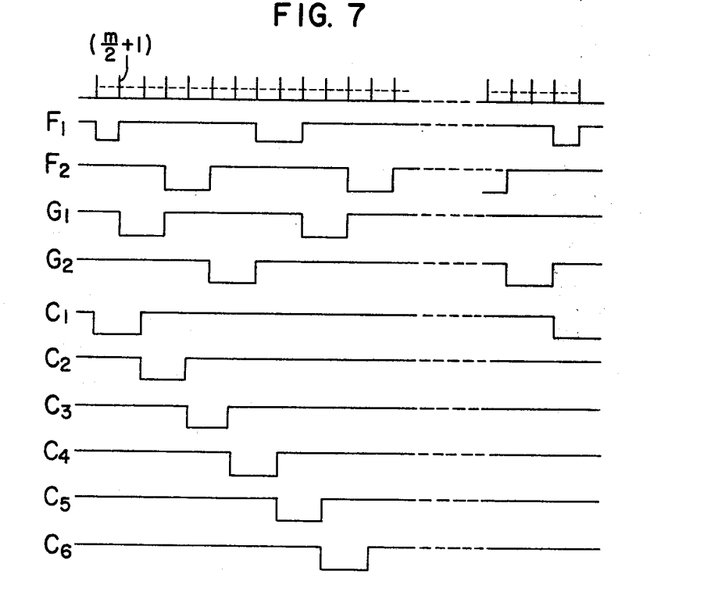
FIG. 7 shows waveforms for explaining the operation of the third embodiment shown in FIG. 6.

A second embodiment shown in FIG. 5 is the case where the auxiliary electrodes $4A_1, 4A_2 \ldots$ in row A are divided into one group including the odd-numbered auxiliary electrodes $4A_1, 4A_3 \ldots$ and the other group including the even-numbered auxiliary electrodes $4B_2, 4B_4 \ldots$ A third embodiment of FIG. 6 and FIG. 7 is such that the auxiliary electrodes in row B including the odd-numbered auxiliary electrodes $4B_1, 4B_3 \ldots$ in row B is further divided into two subgroups one of which consists of the auxiliary electrodes $4B_1, 4B_5 \ldots$ and the other of which consists of the auxiliary electrodes $4B_3, 4B_7 \ldots$, and the every other auxiliary electrodes of each subgroup are in the same potential. In this embodiment, the voltages at the terminals $C_1, C_2 \ldots$ for the auxiliary electrodes in row A are identical to the first embodiment. However, in the group of odd-numbered auxiliary electrodes in row B the one subgroup of electrodes $4B_1, 4B_5 \ldots$ are selected by a signal at the terminal $F_1$ and the other subgroup of electrodes $4B_3, 4B_7 \ldots$ by a signal at the terminal $F_2$, while the group of even-numbered auxiliary electrodes in row B, the auxiliary electrodes $4B_2, 4B_6 \ldots$ are selected by a signal at the terminal $G_1$ and the auxiliary electrodes $4B_4, 4B_8 \ldots$ by a signal at the terminal $G_2$. In this embodiment, four driving circuits are required for the auxiliary electrodes in row B though the number of the auxiliary electrodes may be reduced as in the preceding embodiments.

Figure 8:
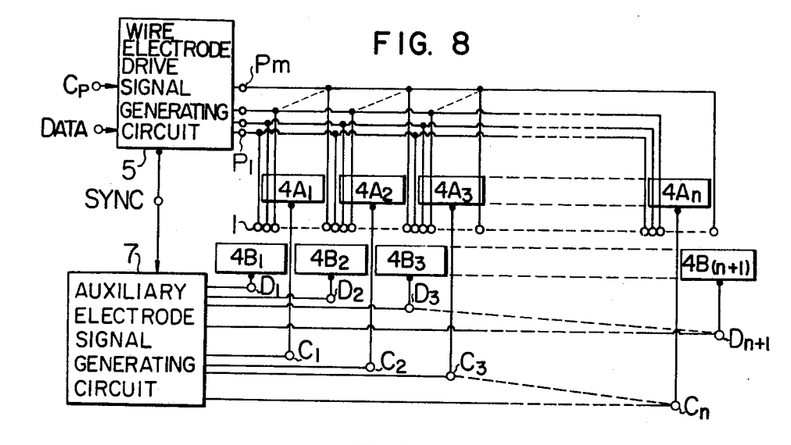
FIG. 8 is a block diagram of a fourth embodiment of the recording apparatus according to the invention.
Figure 9:
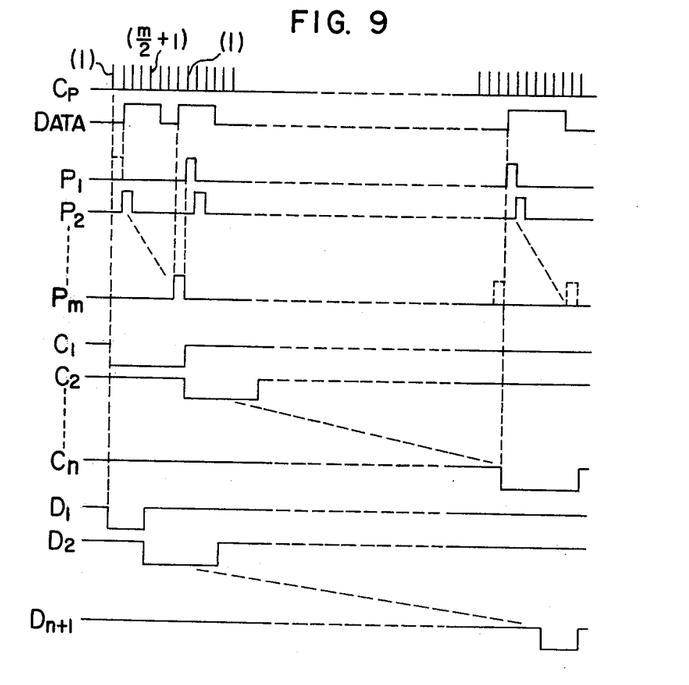
FIG. 9 shows waveforms for explaining the operation of the fourth embodiment shown in FIG. 8.

FIGS. 8 and 9 show a fourth embodiment in which the auxiliary electrodes $4B_1, 4B_2 \ldots$ in row B are energized individually according to the respective blocks in the same way as row A. In other words, the auxiliary electrode signal generating circuit 7 has terminals $D_1, D_2 \ldots D_{n+1}$ also for the auxiliary electrodes $4B_1, 4B_2 \ldots$ in row B, so that each time the information signal terminal $$P\left(\frac{m}{2}+1\right)$$

of each block is scanned the auxiliary electrodes $4B_1, 4B_2 \ldots$ are energized sequentially. In this embodiment, the number of the auxiliary electrodes may be also reduced as in the preceding embodiments.

Figure 10:
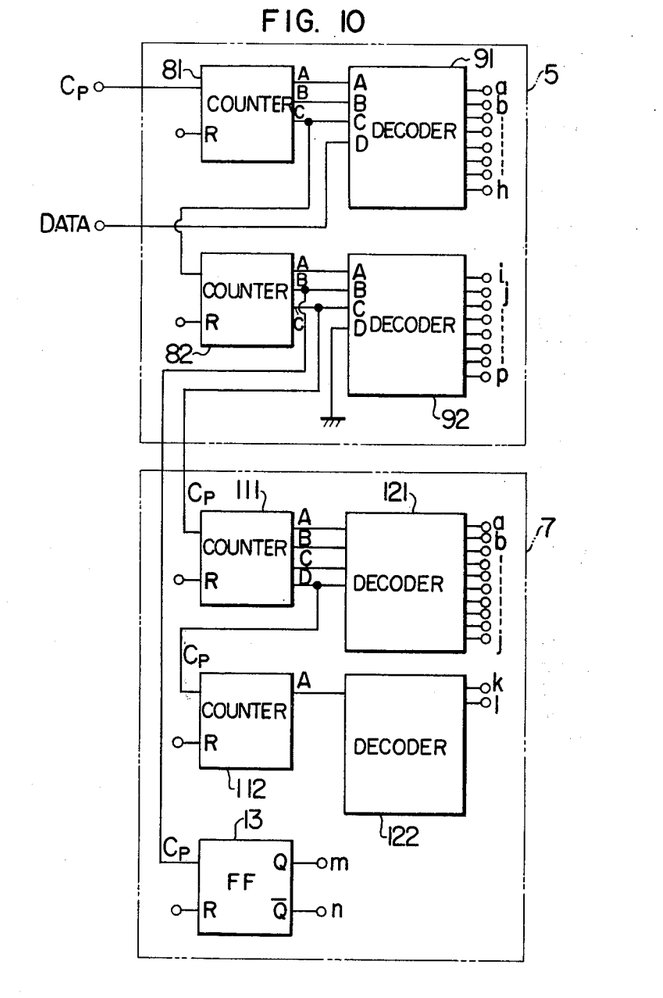
FIG. 10 is a circuit diagram showing a concrete example of the embodiment shown in FIG. 8.
Figure 11:
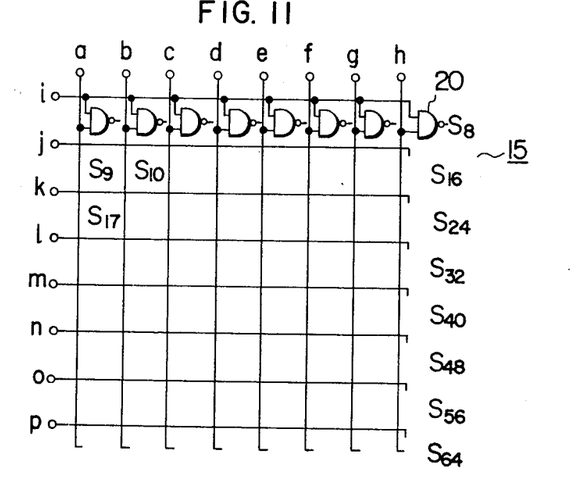
FIG. 11 is a scanning circuit diagram for a wire electrode drive signal generating circuit.

FIG. 10 is a block diagram showing a concrete example of the circuit of the embodiment shown in FIG. 8. In this example, 64 recording or wire electrodes are provided in each block. The wire electrode drive signal generating circuit 5 comprises counters 81, 82 and decoders 91, 92 and predetermined clock pulses are applied to the counter 81 from the clock pulse terminal $C_p$. The output of the counter 81 is applied to the decoder 91. On the other hand, the information signal from the DATA terminal is applied to the D terminal of the decoder 91. Further, the output from the C terminal of the counter 81 is produced as a clock pulse to be applied to the input terminal of the counter 82, the output of which in turn is applied to the decoder 92. The decoders 91 and 92 has eight output terminals $a$ to $h$ and $i$ to $p$ respectively, thus constituting a matrix circuit 15 having 8 × 8 NAND gates 20 as shown in FIG. 11.

The auxiliary electrode signal generating circuit 7 comprises counters 111, 112, decoders 121, 122 and a flip-flop 13. The synchronizing signals SYNC to the auxiliary electrode signal generating circuit 7 are applied from the B and C terminals of the counter 82 of the wire electrode drive signal generating circuit 5. In other words, simultaneously with the application of the output of the C terminal of the counter 82 to the counter 111 as a clock signal, the output produced at the B terminal is applied to the flip-flop 13 as a clock signal.

Figure 12:
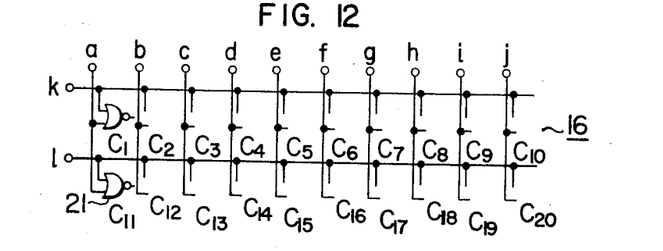
FIG. 12 and FIG. 13 are scanning circuit diagrams for an auxiliary electrode signal generating circuit.

The output signals from the counter 111 are applied to the decoder 121, while at the same time a clock signal is applied to the counter 112 from the D terminal of the counter 111. The output from the counter 112 is applied to the decoder 122. The decoders and 122 have ten output terminals $a$ to $j$ and two output terminals $k$ to $l$ respectively, thus constituting a matrix circuit 16 having 2 × 10 NOR gates 21 as shown in FIG. 12.

Figure 13:
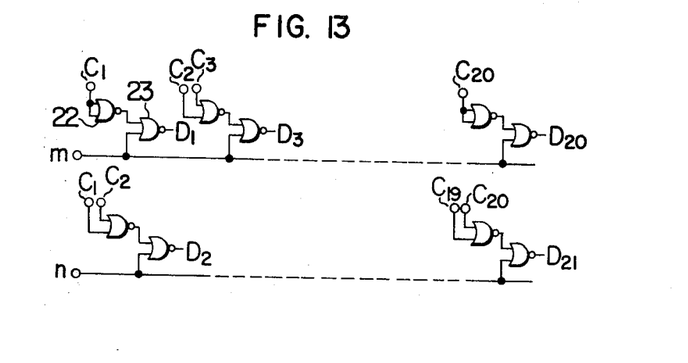
Figure 15:
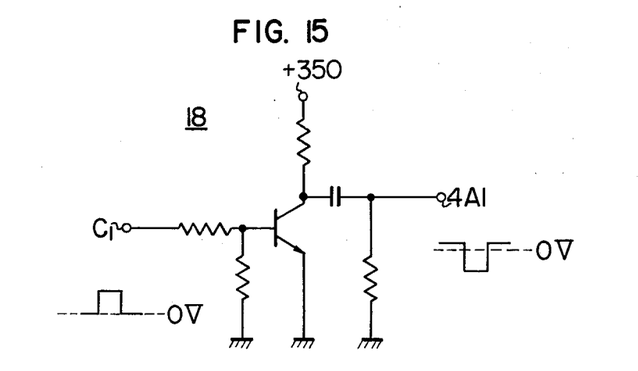
FIG. 15 is a diagram showing an auxiliary electrode driving circuit.

The output terminals $C_1$ to $C_{20}$ of the NOR gates 21 of the matrix circuit 16 are connected to the auxiliary electrodes $4A_1$ to $4A_{20}$ respectively through a driving circuit 18 of FIG. 15 and to the output terminals $m$ and $n$ of the flip-flop 13 through the NOR circuits 22 and 23 as shown in FIG. 13. The output terminals $D_1$ to $D_{21}$ of the NCR circuits 23 are connected to the auxiliary electrodes $4B_1$ to $4B_{21}$ respectively through the driving circuit 18 of FIG. 15.

Figure 14:
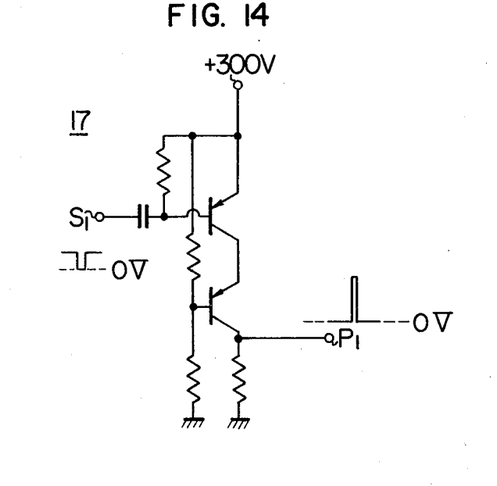
FIG. 14 is a diagram showing a wire electrode driving circuit.

The output terminals $S_1$ to $S_{64}$ of the NAND gates 20 of the matrix circuit 15 are connected to the information signal terminals $P_1$ to $P_{64}$ respectively of the wire electrode groups through a driving circuit 17 of FIG. 14.

With this circuit arrangement, the counters 81 and 82 are actuated by a clock pulse, the 64 NAND gates 20 of the matrix circuit 15 are sequentially scanned by the decoders 91 and 92, and the information signals are applied to the information signal terminals $P_1$ to $P_{64}$ through the driving circuit 17. In synchronism therewith, the auxiliary electrodes $4A_1, \ldots$ and $4B_1, \ldots$ are scanned. As a result, the recording is effected in accordance with an information signal applied.

In spite of the foregoing description in which the wire electrode groups and the auxiliary electrodes are disposed respectively along both sides of the recording paper, it will be understood that the invention is not limited to such an application. It may be applicable to the recording apparatus in which the wire electrode groups and the auxiliary electrodes are disposed along only one side of the recording paper.

What is claimed is:

1. An electrostatic recording apparatus comprising:
a wire electrode row including a multiplicity of wire electrodes which are continuously arranged substantially in a row and are divided into a plurality of wire electrode blocks each having the same number of wire electrodes;
a pair of first and second auxiliary electrode rows provided respectively along both sides of and opposite to the wire electrode row, the auxiliary electrodes of the first auxiliary electrode row being arranged in a zigzag form relative to those of the second auxiliary electrode row and each of the auxiliary electrodes having approximately the same length as that of each of the wire electrode blocks;
a driving circuit for simultaneously driving the corresponding same-numbered wire electrodes of the respective wire electrode blocks, the driving of the wire electrodes in each of the wire electrode blocks being carried out in accordance with the numbered order thereof within a respective wire electrode block; and
a scanning circuit for scanning a selected auxiliary electrode of one of the first and second auxiliary electrode rows in cooperation with a first selected auxiliary electrode of the other of the first and second auxiliary electrode rows and subsequently in cooperation with a second selected auxiliary electrode of the other of the first and second auxiliary electrode rows.

2. An electrostatic recording apparatus according to claim 1, in which the every other auxiliary electrodes of either one of the first and second auxiliary electrode rows are connected to the same potential.

3. An electrostatic recording apparatus according to claim 1, wherein the auxiliary electrodes of the first and second auxiliary electrode rows are offset from one another in the scanning direction.

* * * * *